United States Patent [19]

Sinker et al.

[11] Patent Number: 4,554,329
[45] Date of Patent: Nov. 19, 1985

[54] MODIFIED PET POLYMERS AND COPOLYMERS SUITABLE FOR EXTRUSION BLOW MOLDING

[75] Inventors: Stephen M. Sinker, Lebanon; Charles E. McChesney, Monmouth Junction, both of N.J.

[73] Assignee: Celanese Corporation, New York, N.Y.

[21] Appl. No.: 696,606

[22] Filed: Jan. 30, 1985

[51] Int. Cl.[4] ............................................. C08G 63/76
[52] U.S. Cl. ................................... 525/437; 528/272; 528/308.2; 528/486
[58] Field of Search ..................... 528/308.2, 486, 272; 525/437

[56] References Cited

U.S. PATENT DOCUMENTS

| | | | |
|---|---|---|---|
| 4,161,579 | 7/1979 | Edelman et al. | 528/486 X |
| 4,223,125 | 9/1980 | Bier et al. | 528/308.2 X |
| 4,393,178 | 7/1983 | Legras et al. | 528/308.2 X |

Primary Examiner—Lucille M. Phynes
Attorney, Agent, or Firm—Burns, Doane, Swecker and Mathis

[57] ABSTRACT

There is disclosed an improved modified polymer suitable for use in making hollow containers by conventional extrusion blow molding. It is a specific type of end-capped and branched polyethylene terephthalate polymer or copolymer. In the improvement, (a) the end-cap comprises the reacted component of a monofunctional acid having a normal boiling point or sublimation point less than above about 200° C.; and (b) the monofunctional acid is an aromatic monocarboxylic acid having the formula:

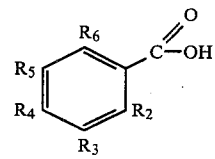

wherein: $R_3$ and/or $R_5$ is an alkoxy group containing from 1 to 10 carbon atoms; and, the remaining R's are hydrogen. The preferred monocarboxylic acid is m-anisic acid. The product typically contains few large gels having diameters greater than 0.1 mm.

7 Claims, No Drawings

MODIFIED PET POLYMERS AND COPOLYMERS SUITABLE FOR EXTRUSION BLOW MOLDING

BACKGROUND (i) Field of the Invention

This invention relates generally to modified polyethylene terephthalate polymers and copolymers that may be processed into plastic containers using conventional extrusion blow molding equipment. More particularly, it relates to polymers of the branched and end-capped type, which polymers contain substantially fewer gels. It also relates to the use of specific end-capping agents for making such polymers in a reproducible manner.

(ii) Prior Art

U.S. Pat. No. 4,161,579 (Edelman 1), hereby incorporated by reference, discloses a large number of modified polyethylene terephthalate polymers (hereinafter modified PET polymers) that can be successfully processed to form a hollow container by conventional extrusion blow molding techniques using existing, conventional, extrusion blow molding equipment. The patent also describes the requirements for polymers suitable for extrusion blow molding. Essentially, such polymers must have (1) "high zero shear rate melt viscosity", and "absence of gels", in order to make a satisfactory "parison" after extrusion of the polymer from the annular die; and (2) sufficiently high "shear sensitivity", in order to be capable of being forced through the melt extrusion equipment without generating excessive pressure. All the polymers disclosed in Edelman 1 involve the use of branching agents and end-capping agents. However, as stated therein, the chain terminating agent "must have a boiling point above 200° C." (see Edelman 1, column 10, lines 30–34) and also is a monofunctional compound containing one —COOH group (or its ester).

U.S. Pat. No. 4,234,708 (Edelman 2) is similar to Edelman 1, except that it relates to a modified polyethylene iso/terephthalate copolymer. Edelman 2 also points out that it is necessary to avoid the presence of excessive amounts of isophthalic acid or dimethyl isophthalate as starting materials for the copolymers, as this will result in the formation of prepolymers which are totally amorphous. Further, such prepolymers possess a particularly low glass transition temperature. They therefore tend to stick together if solid state polymerization is attempted at normally employed temperatures (in order to increase molecular weight and give sufficiently "high zero shear rate melt viscosity"). This, in turn, reduced the surface area from which glycol can evaporate. Also, Example H shows that when a copolymer is prepared from terephthalic acid and isophthalic acid in a ratio of 75:25 by weight, the prepolymer is completely amorphous and therefore is not capable of solid-state polymerization to increase molecular weight. (See Edelman 2 at column 10, lines 15–31 and column 23, lines 27–34.)

U.S. Pat. No. 4,219,527 (Edelman 3) is similar to Edelman 1, except that it is directed to a blow molding process.

Defensive Publication No. T954,005, published Jan. 4, 1977, discloses a process for preparing containers, such as bottles, using a branched polyester of terephthalic acid, a combination of ethylene glycol and 1,4-cyclohexanedimethanol and a small amount of a polyfunctional branching compound. A molten parison of such polyester is extruded and then expanded in a container mold to form the desired container. More specifically, the polyester used for that invention can be broadly described as comprised of terephthalic acid and a diol component comprised of 10 to 40 mole percent 1,4-cyclohexanedimethanol and 90 to 60 mole percent ethylene glycol and a polyfunctional branching compound (see unexamined application at page 4, lines 18–21). Examples of the polyfunctional branching compound are given at page 4, lines 22–31 of the unexamined application, and include pentaerythritol, and trimethylolpropane. In addition, the unexamined application states the following at page 5, lines 14–31 concerning the possible use of chain terminators to prevent the formation of gels in the polyesters. "The rapid buildup of molecular weight can produce a nonuniform gel in the polyester. To control this rapid rate of polymerization and to obtain the desired degree of polymerization, it is often desirable to use a chain terminator in accordance with techniques well known in the art. By using the proper level of chain terminator the polymer can be stopped at the desired degree of polymerization. Useful terminators include monofunctional acids, esters or alcohols. It is often desirable to use a relatively nonvolatile terminator since the terminator can be lost by volatilization during polycondensation. Examples of terminators that can be used include heptadecanoic acid, stearic acid, nonadecanoic acid, benzoic acid, phenylacetic acid, 4-biphenylcarboxylic acid, phenyloctadecanoic acid, 1-heptadecanol, 1-octadecanol, and 1-nonadecanol. Lower molecular weight terminators such as acetic acid, propionic acid, methanol and ethanol can also be used."

Some of the chain terminators suggested in the defensive publication, e.g. methanol and ethanol, are well known to have boiling points far below 200° C. However, nowhere does the defensive publication disclose a solid-phase polymerization process. Further, it is believed that at least most of the copolymers described in the defensive publication are so-called "amorphous" polymers, and as such would be incapable of being commercially solid-phase polymerized to give polymers of very high molecular weight.

Essentially, for the purpose of the invention claimed hereinafter, the prior art does not appear to disclose an end-capping agent for PET polymer or copolymer that has a boiling point or sublimation point less than above about 200° C. and is also an aromatic monocarboxylic acid wherein any of the remaining end groups are alkoxy groups containing from one to ten carbon atoms. Even less does such art relate to the relative effectiveness of isomers of such compounds.

SUMMARY OF THE INVENTION

In contrast to the aforementioned prior art relating to polyethylene terephthalate and polyethylene iso/terephthalate, it has now been surprisingly discovered that certain specific compounds are suitable as end-capping agent even though they have a boiling point less than above about 200° C. Further, it appears that these compounds can result in polymers having even lower gel content than prior art products prepared from the end-capping reagents used in any of the Examples of aforementioned Edelman 1, 2, or 3. More specifically the broadest aspect of the invention is an improved modified PET polymer or copolymer of the type having high zero shear rate melt viscosity and shear sensitivity, comprising end-capped and branched polyethylene terephthalate polymer or copolymer molecules comprising terephthalic acid structural units and isophthalic acid structural units, wherein, the improvement comprises the combination of:

(a) the end-cap comprises the reacted component of a monofunctional acid having a normal boiling point or sublimation point less than above about 200° C.; and (b) the monofunctional acid is an aromatic monocarboxylic acid having the formula:

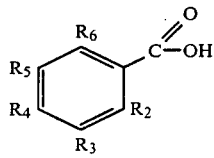

wherein: $R_3$ and/or $R_5$ is an alkoxy group containing from 1 to 10 carbon atoms; and, the remaining R's are hydrogen.

DESCRIPTION OF THE PREFERRED EMBODIMENTS

The nature of the preferred embodiments of the invention is best understood by the Examples contrasted with the Comparative Examples and Control Examples hereinafter. Such Examples are not intended to limit the scope of the invention.

The following terms as used herein have the same definitions as those found in Edelman 1, particularly columns 7 and 8: "melt strength (MS)"; "high melt strength"; "polyester"; "parison"; "die swell"; and "shear sensitivity". The term "polyester" as used herein is any high molecular weight synthetic polymer composed of at least 85% by weight of an ester of a dihydric alcohol and terephthalic acid (p—HOOC—$C_6H_4$—COOH). Further, "inherent viscosity" and "intrinsic viscosity" were measured as described in Example 1 below. A "gel test" is also described in Example 1 below. It should be noted that it is a more stringent test than was used in Edelman 1, 2 or 3. In addition, the term "sublimation point" of a compound is used herein to denote the temperature at which the compound passes directly from the solid state to the vapor phase, at atmospheric pressure.

In practicing the instant invention it is preferred that the end-capped polymers have properties as shown in the claims hereinafter.

EXAMPLE 1

This Example illustrates the use of m-anisic acid as an end-capping agent in making polymers of the present invention. This acid boils at about 170° C. at atmospheric pressure.

The polymer was made and tested according to the following procedures. Briefly, (1) an ester interchange reaction was carried out using 96 parts by weight dimethyl terephthalate, 4 parts by weight dimethyl isophthalate, ethylene glycol in a molar ration of 2.2:1; 0.3 parts by weight pentaerythritol as branching agent, in the presence of 180 parts per million $Mn(OAc)_2.4H_2O$ (as catalyst); (2) 110 parts per million polyphosphoric acid (as stablizer) and m-anisic acid (as end-capping agent in an amount of one equivalent of end-capping agent per branching agent, i.e. 4 moles of m-anisic acid for each mole of pentaerythritol) were added to the product of the ester interchange reaction; this mixture was then conventionally polymerized in the molten state in the presence of 480 ppm $Sb_2O_3$ as catalyst; (3) the resultant molten polymer was pelletized and thereafter crystallized at a temperature of 140° C.; (4) separate samples of the crystallized prepolymer were then subjected to solid-phase polymerization under vacuum at a temperature of 220° C. for periods of 0, 3, 5, and 7 hours; and (5) all four polymer samples were thereafter subjected to a "gel test" (described below) that involved dissolving the polymers and visually examining the resulting solutions for the presence of gels, particles and color changes. More specifically, each of the foregoing five steps is described in more detail hereinafter.

Catalysts were added to the about 1 lb. yield reaction mixture before beginning ester interchange. The ester interchange was conducted at atmospheric pressure in a stirred stainless steel, 1 liter reactor. It was fitted with a pipe plug in the bottom, and heated by an electric heating mantle. The mantle was controlled by means of a thermocouple, immersed in the reactive mass, connected to a temperature indicating controller which supplied power to the heating mantle as required to maintain the set point temperature in the mass. The current to the stirrer was monitored by an ammeter which indicated the amount of power consumed by the drive motor. The reactor was fitted with a long fractionating, Vigoreaux-type air cooled condenser for the ester interchange portion of the reaction. Electric heating tape partially covered the column in order to control the heat loss and thus the reflux rate. The methanol evolution rate during ester interchange was controlled by the column temperature and batch temperature. To start the ester interchange process the temperature of the reaction mass was raised to about 90°–100° C. to melt and dissolve the reactants (DMT m.p. = 83.5° C.). Once melted, the temperature was then steadily raised just fast enough to complete the EI reaction in about 2–3 hours. The actual ester interchange reaction began when the reactants reached about 150° C. and continued until about 100% of the theoretical yield of methanol had been obtained and the glycol started evolving. At this point, the reaction mass generally reached the temperature of about 215° C.

At this time, the end capper and stabilizer were added and the reaction converted to the polycondensation mode by quickly removing the air-cooled condenser used during ester interchange. The air cooled condenser was replaced with a special vacuum condenser, internally baffled to prevent the entrainment of solids in the ethylene glycol vapor and which also condensed ethylene glycol vapor without allowing the condensate to return to the reaction mass during polymerization. A vacuum pump with suitable trapping and a nitrogen bleed to control vacuum levels was attached to a side port on the ethylene glycol receiver. In order to prevent excessive volatilization of the product ethylene glycol, the receiver was immersed in a dry ice/methanol mixture to keep it cold and reduce the ethylene glycol vapor pressure. The condensation reaction began as the temperature was raised from 215° C. to about 230°–240° C. at which point vacuum was gradually applied to facilitate the condensation reaction by removing the ethylene glycol by-product. The vacuum level was ramped from 1 atmosphere down to about 1 mm Hg over the period of about 30 minutes to 1 hour. Reaction mass temperature was steadily raised by application of heat to a maximum temperature of 270° C. over the course of about 1–2 hours and then during the last hour or so the vessel was held at full vacuum and the maximum temperature. The reaction was terminated when the ammeter indicated that the torque in the stirrer had reached a predetermined value corresponding to the desired molecular weight. This molecular weight was measured by solution viscosity yielding an intrinsic viscosity of about 0.55–0.65 dl/gm. To measure this, the inherent viscosity was measured in orthochlorophenol at a concentration of 8% and via a correlation to the intrinsic viscosity was computed.

Upon completion of the polycondensation, the reaction was halted by "breaking" the vacuum by valving off the pump and adding an inert gas purge (N2). After reaching atmospheric pressure, the pipe plug in the bottom of the reactor was carefully removed and the reaction mass was drained from the vessel under a modest nitrogen pressure (1–2psi). The strand issuing from the reactor was quenched in an ice water bath to solidify it, and then chipped into pellets. The chipped polymer was screen-classified to a uniform size. It was then crystallized to prevent the pellets from fusing together when reheated near the melting point for the solid state polymerization. The crystallization process was rapidly effected by heating the pellets for about one hour to about 140° C. This process also dried the pellets of excessive surface moisture.

To characterize the relative effectiveness of end-capping agents in preventing gelation of branched polyesters during solid state polymerization to the higher molecular weights required for good processing in conventional extrusion blow molding equipment, a severe solid state polymerization cycle was used; followed by dissolving the resins in a good solvent (1:1 by volume of trifluroacetic acid: methylene chloride); and followed in turn by visual observation for the presence of gels. In particular, the polyester resins obtained from the conventional melt polymerization step were dried and crystallized as described earlier. Then 5 grams of the hot, crystalline resin were placed in a 50ml round bottom flask. The polymer was placed in the flask so that the sample was in intimate contract with the glass walls and not "layered" atop other polymer particles. The flask was immersed in an oil bath controlled at 225±1° C. and sealed with a stopper containing an evacuation tube which was connected to a vacuum line and maintained at less than 0.1mm Hg internal pressure. Three such vessels were used for each resin and one vessel was removed from the hot oil bath after 3, 5, and 7 hours and allowed to cool to ambient temperature for 16 hours under 0.1mm Hg internal pressure (vacuum) to prevent influx of air and water etc. onto the hot resin which may cause oxidation or hydrolysis and thus loss of molecular weight gained from solid state polymerization. After cooling, 1 gram of the sample was placed in 10ml of a 1:1 solution by volume of trifluoroacetic acid:methylene chloride, a strong solvent for polyethyleneterephthalates. The solution was agitated for 16 hours in a capped 25ml test tube. After agitation, the solution was observed in strong incandescent light for the presence of gels which are fluorescent in solution under these conditions. The samples were visually rated according to whether the solution contained any particles; and if so, the size and shape of the particles of gel. Obviously, the longer the solid phase polymerization time required for the formation of gels, the more efficient is the chain regulator in preventing gelation.

The following abbreviated terminology is used hereinafter in connection with the analysis of the final polymer samples. "s" denotes the presence of solution only. "F" denotes the presence of fibrous material in solution. "p" denotes the presence of fine particles in solution. "g" denotes the presence of small gels having diameters less than about 0.1mm in solution. "G" denotes the presence of large gels having diameters greater than about 0.1mm in solution. "$\underline{G}$" denotes the presence of many very large gels in solution, where the gels appeared to have the shape and size of preexisting pellet samples.

It will be noted that the use of 1.35 weight percent m-anisic acid resulted in polymers with gel test results of s/s/F/g at 0/3/5/7 hours respectively.

COMPARATIVE EXAMPLE 1A

Example 1 was repeated except that o-anisic acid was used in place of m-anisic acid. The resultant polymers had gel test results of s/G/G/$\underline{G}$. Thus, the product was inferior to the product of Example 1.

COMPARATIVE EXAMPLE 1B

Example 1 was repeated except that p-anisic acid was used rather than m-anisic acid. The resultant polymers had gel test results of p/G/G/$\underline{G}$. Thus, the product was significantly inferior to that of Example 1.

COMPARATIVE EXAMPLE 1C

Example 1 was repeated except that 1.1% by weight of m-chlorobenzoic acid (one equivalent per PE) was used in place of m-anisic acid. The resultant polymers had gel contents of s/g/g/G. It will be noted that the product was significantly inferior to that of Example 1.

COMPARATIVE EXAMPLE 1D

Example 1 was repeated except that 2.50 weight percent of o-anisic acid was used rather than m-anisic acid. Two different test results were obtained as follows: s/s/F/g and s/p/g/G. On average, the product was inferior to that of Example 1 and perhaps marginally better than that of Comparative Example 1C.

COMPARATIVE EXAMPLE 1E

Example 1 was repeated except that 1.1 percent by weight p-chlorobenzoic acid (one equivalent per PE) was used in place of m-anisic acid. The resultant polymers had gel test results of s/$\underline{G}$/$\underline{G}$/$\underline{G}$.

CONTROL EXAMPLE 1F

Example 1 was repeated except that 1.02 weight percent benzoic acid (one equivalent per PE) was used rather than m-anisic acid. The gel test results of the resultant polymers were s/G/$\underline{G}$/$\underline{G}$.

CONTROL EXAMPLE 1G

Example 1 was repeated except that 1.41 weight percent stearic acid (one equivalent per PE) was used rather than m-anisic acid. The resultant polymers had gel test results of s/g/G/$\underline{G}$.

CONTROL EXAMPLE 1H

Example 1 was repeated except that 1.20 weight percent methyl benzoate (one equivalent per PE) was used rather than m-anisic acid. The gel test results of the resultant polymers were s/g/$\underline{G}$/$\underline{G}$.

EXAMPLE 2

Example 1 was repeated except that 2.15 weight percent of m-anisic acid (1.6 equivalent per PE) was used rather than 1.35 weight percent. The resultant polymers had gel test results of s/s/g/G.

COMPARATIVE EXAMPLE 2A

Example 2 was repeated except that 2.15 weight percent of p-anisic acid (1.6 equivalent per PE) was used rather than m-anisic acid. The resultant polymers had gel test results of s/G/G/G.

CONTROL EXAMPLE 2B

Example 2 was repeated except that 1.72 weight percent of benzoic acid (1.6 equivalent per PE) was used rather than m-anisic acid. The resultant polymers had gel test results of p/g/G/G.

EXAMPLE 3

Example 1 was repeated except that 2.68 weight percent of m-anisic acid (2.0 equivalent per PE) was used rather than 1.35 weight percent. The resultant polymers had gel test results of s/s/g/G.

COMPARATIVE EXAMPLE 3A

Example 2 was repeated except that 2.68 weight percent of p-anisic acid (2.0 equivalent per PE) was used rather than m-anisic acid. The resultant polymers had gel test results of s/p/g/G.

CONTROL EXAMPLE 3B

Example 3 was repeated except that 2.15 weight percent of benzoic acid (2.0 equivalent per PE) was used rather than 2.68 weight percent of m-anisic acid. The resultant polymers had gel test results of p/gF/g/G.

What we claim is:

1. An improved modified polyethylene terephthalate polymer or copolymer of the type having high zero shear rate melt viscosity and shear sensitivity, comprising end-capped and branched polyethylene terephthalate polymer or copolymer molecules comprising terephthalic acid structural units and isophthalic acid structural units, wherein the improvement comprises the combination of:
   (a) the end-cap comprises the reacted component of a monofunctional acid having a normal boiling point or sublimation point less than above about 200° C.; and
   (b) the monofunctional acid is an aromatic monocarboxylic acid having the formula:

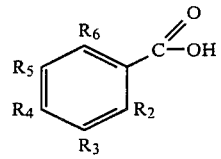

wherein: $R_3$ and/or $R_5$ is an alkoxy group containing from 1 to 10 carbon atoms; and, the remaining R's are hydrogen.

2. The polymer of claim 1 having an inherent viscosity greater than 1.0 dl/gram, and wherein the weight ratio of terephthalic acid structural units to isophthalic acid structural units in the modified polymer is in the range from about 85:15 to 100:0.

3. The polymer of claim 2 wherein the inherent viscosity is greater than 1.2 dl/gram and the weight ratio of terephthalic acid structural units to isophthalic acid structural units is in the range from about 91:9 to 100:0.

4. The polymer of claim 3 having an inherent viscosity greater than 1.4 dl/gram and a weight ratio of terephthalic acid structural units to isophthalic acid structural units in the range from about 93:7 to about 98:2.

5. The polymer of claim 3 comprising an absence of large gels having diameters greater than about 0.1mm.

6. The polymer of claim 3 wherein the monocarboxylic acid is m-anisic acid.

7. The polymer of claim 3 wherein both $R_3$ and $R_5$ are alkoxy groups.

* * * * *